United States Patent [19]

Cooper

[11] 4,349,211
[45] Sep. 14, 1982

[54] BUMPER HITCH

[76] Inventor: George N. Cooper, R.R. #1, Site 7, Chase, British Columbia, Canada, V0E 1M0

[21] Appl. No.: 5,250

[22] Filed: Jan. 22, 1979

[51] Int. Cl.³ .............................................. B60D 1/00
[52] U.S. Cl. ..................................... 280/481; 56/13.4; 280/478 R; 280/492; 280/495; 280/505; 403/188; 403/263
[58] Field of Search ............... 280/415 R, 415 A, 417, 280/456 R, 456 A, 460 R, 460 A, 477, 481, 478 R, 495, 500, 502, 504, 505, 508, 510, 515, 492; 403/31, 263, 70, 71, 385, 386, 388, 188, 322; 56/13.4, 13.6, 13.8, 13.9

[56] References Cited

U.S. PATENT DOCUMENTS 2,849,851 9/1958 Hayter .................................. 56/13.4
3,822,534 7/1974 Martin .................................. 56/13.9
4,180,282 12/1979 Henning ............................... 280/481

Primary Examiner—Joseph F. Peters, Jr.
Assistant Examiner—Donn McGiehan
Attorney, Agent, or Firm—Fulwider, Patton, Rieber, Lee & Utecht

[57] ABSTRACT

A trailer hitch comprises two elongate bumper members, a trailer bumper member connectable to the trailer near one end thereof and a tractor bumper member connectable to the tractor near one end thereof so that the trailer bumper member contacts the tractor bumper member when the trailer is connected to the tractor. A male hitch member is connected to the trailer bumper member and extends outwardly therefrom. A recess in the tractor bumper member receives the male hitch member. A latch connected to the tractor bumper member releasably secures the male hitch member. The trailer hitch is particularly adapted for connecting a forage harvester to the front of a truck.

11 Claims, 6 Drawing Figures

BUMPER HITCH

BACKGROUND OF THE INVENTION

This invention relates to a trailer hitch for connecting a trailer to a tractor.

In this past, there have been two basic types of power operated forage harvesters, self-propelled forage harvesters and tractor-hauled harvesters. The self-propelled forage harvesters are relatively expensive, particularly for the small acreage farmer. While the tractor-hauled units have been considerably simpler and more economical, they do require a standard farm tractor for hauling the harvester and a wagon must be hauled behind the harvester to catch the crop thrown from the harvester's discharge duct. Farmers with a relatively small acreage and part-time farmers may not have a suitable tractor or wagon. Although most farmers would have a suitable wagon and tractor, they may not wish to tie up this equipment in the harvesting of the forage crop. Consequently, there is a need for a relatively simple and economical forage harvester which doesn't require a farm tractor and separate wagon.

Relevant prior art includes U.S. Pat. No. 2,191,749 to Brown which discloses a truck bumper having the female portion of a coupling mounted within the bumper. U.S. Pat. No. 3,547,469 to Sancioni discloses a bumper-mounted hitch with springs for reducing the coupling shock. U.S. Pat. No. 1,173,479 to Buckman shows a coupling mechanism with an arrow-shaped male portion. U.S. Pat. No. 3,717,362 to Johnson and U.S. Pat. No. 4,022,490 to Rocksvold may also be considered relevant.

SUMMARY OF THE INVENTION

According to this invention, a trailer hitch for connecting a trailer to a tractor comprises two elongate bumper members. A trailer bumper member is connectable to the trailer near one end thereof and a tractor bumper member is connectable to the tractor near one end thereof. The trailer bumper member contacts the tractor bumper member when the trailer is connected to the tractor. A male hitch member connected to a first said bumper member extends outwardly therefrom. A recess in a second said bumper member receives the male hitch member. Latch means connected to a second bumper member releasably secures the male hitch member.

Preferably, the male hitch member is pivotally connected to the first bumper member.

According to another aspect of the invention, there is provided a combination of the trailer hitch and a forage harvester. The trailer bumper member is connected to the harvester near the rear end.

According to a further aspect of the invention, there is provided a combination of the trailer hitch, the forage harvester and the tractor, the tractor comprising a truck.

The trailer hitch according to the invention securely connects a tractor to a trailer for the pushing or pulling of the trailer by the tractor. As used herein, the terms "trailer" and "tractor" have the broadest meaning including a forage harvester and a truck respectively. While other uses for the trailer hitch are possible, it is particularly suited for connecting a forage harvester to the front of a truck. This combination of the truck, trailer hitch and forage harvester permits the harvesting of a forage crop without the need for a farm tractor or separate wagon. The trailer hitch permits the harvester to be pushed by a truck and the forage crop can be discharged directly into the back of the truck from the harvester. The operation of the forage harvester can be controlled from the cab of the truck so that the harvesting can be accomplished by a single person.

In drawings which illustrate embodiments of the invention:

Figure 1:
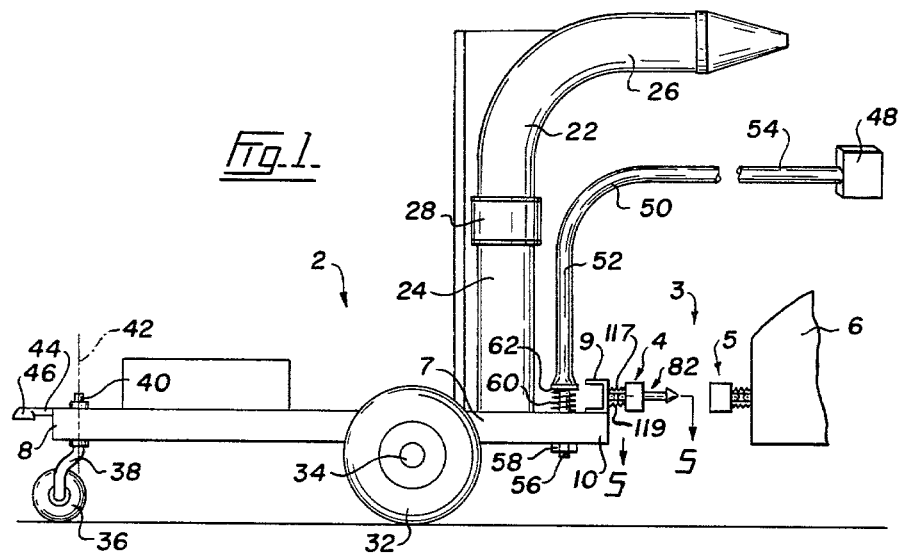
FIG. 1 is a side elevational view of a forage harvester and trailer hitch, according to an embodiment of the invention, and a fragmentary view of the front end of a truck.
Figure 3:
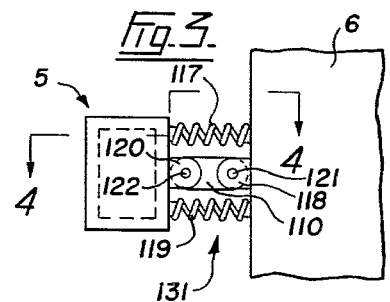
FIG. 3 is a side elevational view of a tractor; bumper member for the truck of FIG. 2.
Figure 5:
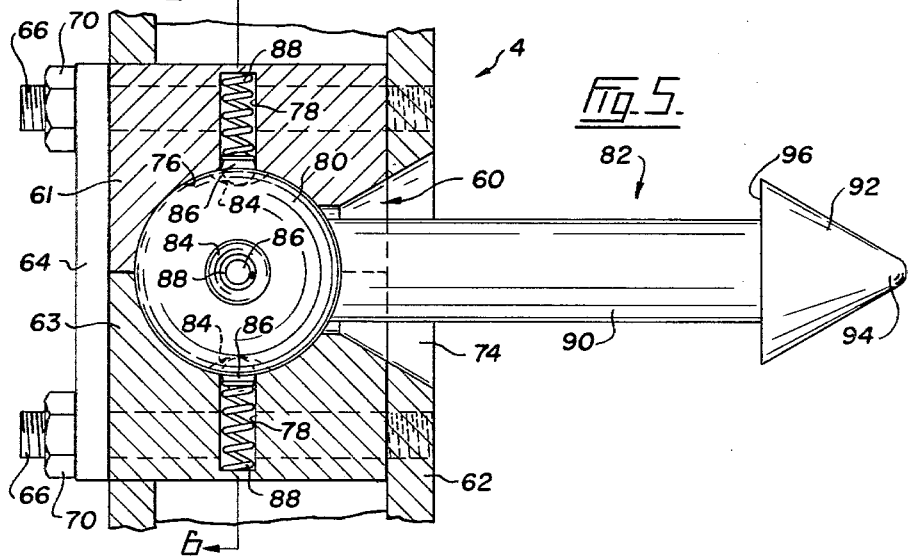
Figure 6:
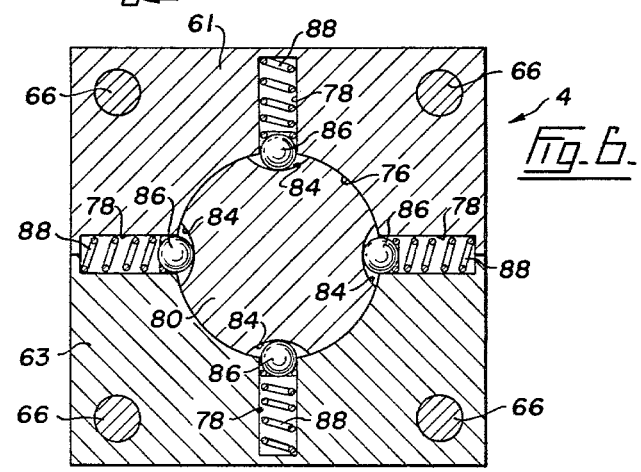

FIG. 5 is a sectional view of the trailer bumper member of FIGS. 1 and 3, taken along line 5—5 of FIG. 1; and FIG. 6 is a sectional view of the trailer bumper member taken along line 6—6 of FIG. 5.

DESCRIPTION OF THE PREFERRED EMBODIMENTS

Referring to the drawings, FIG. 1 shows a forage harvester 2 adapted to be pushed by a truck 6 during the harvesting operation. A trailer hitch 3 comprises a harvester bumper member 4 and a truck bumper member 5. The harvester 2 has a frame 7 with a front end 8 and a rear end 10. The trailer bumper member 4 is connected to channel section 9 welded to the top of frame 7 at the rear end 10. The harvester 2 is generally similar to conventional forage harvesters commonly available. A discharge duct 22 has a vertical portion 24 extending upwardly from the frame 7. An elbow section 26 of the discharge duct 22 is connected to the vertical section 24 by a pivotable member 28. The crop discharged from duct 22 has sufficient velocity to reach the box at the rear of truck 6. The harvester 2 has a pair of wheels 30 and 32 mounted on an axle 34 connected to the frame 7 adjacent the discharge duct 22. A third wheel 36, near the front end 8 of the frame, is mounted on a strut 38 connected to a shaft 40 which is pivotable in frame 7 about the vertical axis 42. Wheel 36 is to the same side of harvester 2 as wheel 32. Extending forwarding from harvester 2, midway between wheels 30 and 32, is a drawbar 44 for the socket portion 46 of a standard trailer hitch. Drawbar 44 and hitch portion 46 are provided for hauling the harvester 2 on a roadway.

The controls the harvester 2 are located on a control box 48 mounted on an elongate pipe member 50. Member 50 has a vertical portion 52 extending upwardly from the rear end 10 of the harvester 2 and a horizontal portion 54 extending rearwardly to the control box 48. Member 50 is rotatably connected to the frame 7 by means of a shaft 56 and a nut 58. A coil spring 60 compressed between shoulder 62 and frame 7 is provided to resist rotation about shaft 56. The horizontal portion of member 50 is of sufficient length that control box 48 can be reached from the window of the truck cab.

Figure 4:
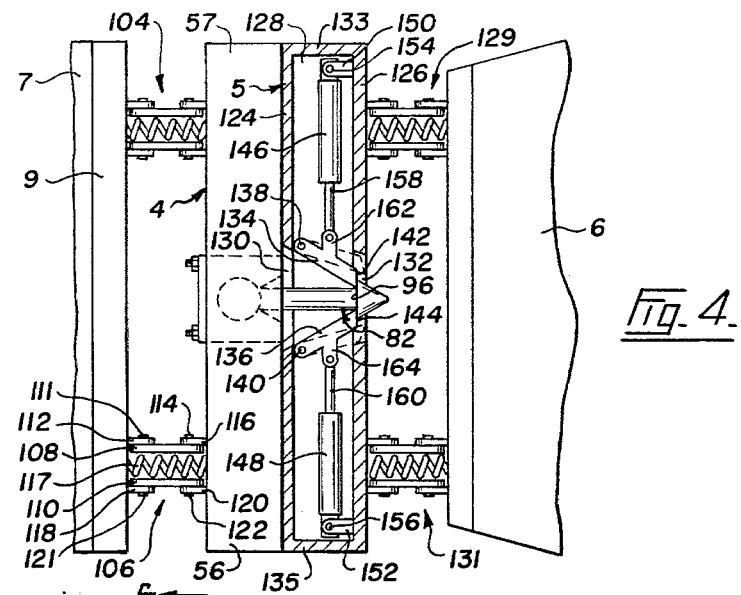
FIG. 4 is a top plan view of the trailer bumper member and a sectional view of the tractor bumper member taken along line 4—4 of FIG. 3.

Referring to FIGS. 4, 5 and 6, the trailer bumper member 4 is shown in more detail. The bumper member 4 is an elongate right rectangular prism with a left end 56 and a right end 57. The trailer bumper member 4 is hollow and is constructed of steel plate and welded throughout.

As seen in FIG. 5, a socket member 60 is fitted within the interior cavity of the bumper member 4 between the front plate 62 and the rear plate 64. Socket member 60 has two symmetrical halves 61 and 63 secured within the bumper member 4 by four studs 66, threadedly received in plate 62, and four corresponding nuts 70 tightened against plate 64. A truncated conical recess 74 of bumper member 4 is formed within the front plate 62 and socket member 60. Recess 74 tapers inwardly and communicates with an internal spherical socket 76 in socket member 60. As seen in FIG. 6, four cylindrical recesses 78 extend upwardly, downwardly and to each side in socket member 60 from spherical socket 76.

Received within spherical socket 76 is the spherical end 80 of the male hitch member 82. The spherical end 80 and socket 76 provides a pivotal connection between hitch member 82 and bumper member 4. Four shallow depressions 84 are spaced 90° apart around spherical end 80 as seen in FIG. 6. When the hitch member 82 is oriented as seen in FIGS. 5 and 6, each of the depressions 84 is adjacent the inner end of one of the cylindrical recesses 78. A steel ball 86 is pressed against each of the depressions 84 by a coil spring 88 compressed within each of the cylindrical recesses 78.

Male hitch member 82 comprises an elongate bar 90 extending forwardly from spherical end 80. Member 82 has an enlarged conical portion 92 with a pointed end 94 on the end distal bumper member 4. An annular shoulder 96 is formed between the conical portion 92 and the bar 90.

As seen best in FIGS. 1, 4 and 5, harvester bumper member 4 is connected to channel section 9 by means of two spaced-apart hinge members 104 and 106. Each hinge member comprises a spaced-apart pair of links 108 and 110. The link 108 is pivotally connected at one end, by means of a link pin 111, to a lug 112 welded to section 9. The other end of link 108 is connected to bumper member 4 by means of link pin 114 and lug 116. Similarly, link 110 is pivotally connected to section 9 and member 4 by lugs 118 and 120 and link pins 121 and 122. A pair of upper and lower coil springs 117 and 119 are located between links 108 and 110 and compressed between channel section 9 and bumper member 4.

As seen in FIG. 4, bumper member 5 has a front plate 124, a rear plate 126 and an interior cavity 128. Bumper member 5 is connected to truck 6 by hinge members 129 and 131, identical to hinge members 104 and 106 of bumper member 4. Aperture 130 in front plate 124 and aperture 132 in back plate 126 taper towards truck 6 and form a recess for receiving male hitch member 82. The recess is located midway between the right end 133 and the left end 135 of bumper member 5. A pair of latches 134 and 136 are hingedly connected to member 5 adjacent aperture 130 by means of pins 138 and 140 respectively. Each of the latches 134 and 136 is an elongate bar extending away from the position of the trailer bumper member 4 and towards the male hitch member 82 when the male hitch member is engaged as shown in FIG. 4. The latches have bevelled ends 142 and 144 distal pins 138 and 140 for engaging with the shoulder 96 of the arrow-shaped hitch member 82.

Received within the cavity 128 of bumper member 5 are a pair of hydraulic cylinders 146 and 148. The ends of the cylinders distal the latch members are connected to bumper member 5 by means of lugs 150 and 152 and pins 154 and 156 respectively. The cylinders 146 and 148 have piston rods 158 and 160, respectively, pivotally connected to lugs 162 and 164 on latches 134 and 136.

Figure 2:
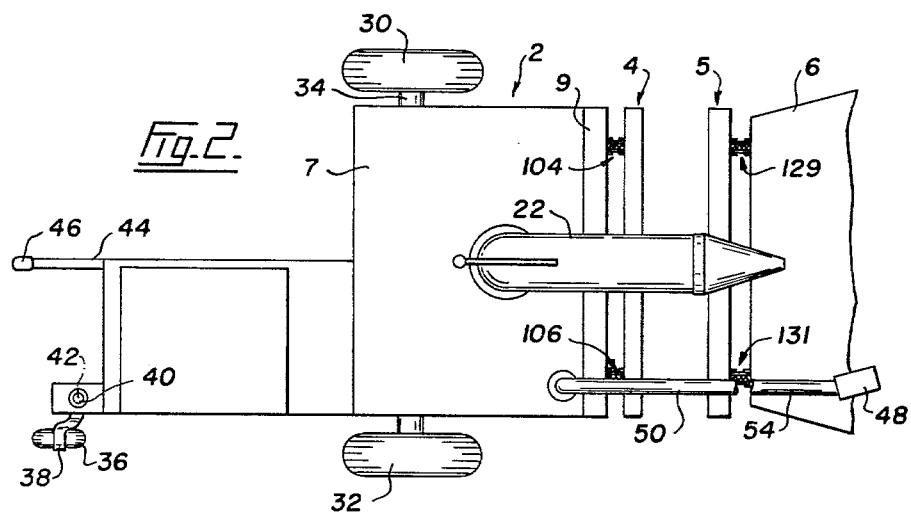
FIG. 2 is a top plan view of the forage harvester and trailer hitch of FIG. 1 and a fragmentary top plan view of the front of the truck.

In operation, the truck 6 is moved towards the harvester 2, as seen in FIGS. 1 and 2, until the male hitch member 82 enters aperture 130 of bumper member 5, as seen in FIG. 4. With fluid pressure applied to cylinders 146 and 148 to urge latches 134 and 136 towards each other, the hitch member 82 passes between the latches until the latches engage with shoulder 96.

Alignment between the male hitch member 82 and the tractor bumper member 4 is provided in several ways. When the male hitch member 82 is approaching aperture 130 in the tractor bumper member 5, the male hitch member can be tilted upwardly, downwardly or to either side as the proper alignment requires. Additionally, vertical movement of bumper members 4 and 5 is permitted by the double hinge of the hinge members 104, 106, 129 and 131. Once the hitch member 82 is engaged by latches 134 and 136, the harvester 2 can be pushed by the truck 6.

When the truck turns, pivoting of the strut 38 about axis 42 permits the wheel 36 to turn so the front end 8 of the harvester can swing in the appropriate direction. When vertical misalignment between the truck 6 and the harvester 2 results from changes in surface contours as the truck moves ahead, relative movement is permitted by the vertical movement of bumper members 4 and 5 permitted by the hinge members 104, 106, 129 and 131 and by vertical movement of male hitch member 82 within the recess of bumper member 5.

Although hitch member 82 and bumper member 5 are free to move as described, springs 117 and 119 tend to maintain the bumper members 4 and 5 in the position shown in FIG. 1. The steel balls 86, resiliently biased against depressions 84 by springs 88, tend to maintain male hitch member 82 in the position shown in FIG. 1. The male hitch member 82 is thereby correctly directed towards the aperture 130 and latches 134 and 136 of bumper member 5 when the truck is moved forwards to connect the truck with the harvester 2.

When it is desired to disconnect the harvester 2 from the truck 6, cylinders 146 and 148 are activated to withdraw piston rods 158 and 160 away from the male hitch member 82. Latches 134 and 136 are pivoted about pins 138 and 140 away from shoulder 96, releasing the male hitch member. The truck 6 may then be backed away from the harvester 2.

For highway purposes, a standard ball and socket-type trailer hitch is provided, the socket portion 46 on the drawbar 44 of the harvester 2 being connected to a corresponding ball portion on the back of truck. The harvester 2 can then be pulled behind the truck as any other trailer.

What I claim is:

1. A trailer hitch for connecting a trailer to a tractor comprising:

two elongate bumper members, a trailer bumper member connectable to the trailer near one end thereof and a tractor bumper member connectable to the tractor near one end thereof so the trailer bumper member contacts the tractor bumper member when the trailer is connected to the tractor;

a male hitch member pivotally connected to a first said bumper member and extending outwardly therefrom;

a recess in a second said bumper member for receiving the male hitch member;

each bumper member having two ends, the male hitch member and the recess being midway between the ends of the bumper members;

latch means connected to the second bumper member for releasably securing the male hitch member, and fluid cylinders operatively connected to the latch means for securing or releasing the male hitch member.

2. A trailer hitch as claimed in claim 1, the male hitch member comprising an elongate bar with a pointed end distal the first bumper member.

3. A trailer hitch as claimed in claim 2, the latch means comprising at least one latch hingedly connected to the second bumper member for engaging the male hitch member between the pointed end and the first bumper member.

4. A trailer hitch as claimed in claim 3, the male hitch member having an enlarged portion adjacent the pointed end, the latch being engageable between the enlarged portion and the first bumper member.

5. A trailer hitch as claimed in claim 4, the male hitch member being generally arrow-shaped.

6. A trailer hitch as claimed in claim 5, comprising two said latches, each latch comprising an elongate bar hingedly connected to the second bumper member to each side of the recess and extending away from the first bumper member and towards the male hitch member when the tractor is connected to the trailer.

7. A trailer hitch as claimed in claim 6, comprising two said fluid cylinders, each fluid cylinder being pivotally connected to one said latch, each fluid cylinder being connected to the second bumper member and extending away from the recess.

8. A trailer hitch as claimed in claim 1, comprising a pair of spaced-apart hinge members for hingedly connecting each said bumper member to the tractor or the trailer, the hinge members each comprising a coil spring connecting said each bumper member to the trailer or tractor.

9. A trailer hitch as claimed in claim 1, the male hitch member having a generally spherical end proximal the first bumper member, the first bumper member having a generally spherical socket for rotatably receiving the spherical end.

10. A trailer hitch as claimed in claim 9, the spherical end of the male hitch member comprising a shallow depression, the first hitch member having a resiliently biased member for engaging with the depression to align the male hitch member.

11. A trailer hitch as claimed in claim 10 comprising four said shallow depressions and four resiliently biased balls comprising said biased member, corresponding balls and depressions being above, below and to each side of the male hitch member.

* * * * *